(12) United States Patent
Wu

(10) Patent No.: US 8,099,984 B2
(45) Date of Patent: Jan. 24, 2012

(54) TIRE LOCK

(76) Inventor: Chun-hsien Wu, Tainan (TW)

( * ) Notice: Subject to any disclaimer, the term of this patent is extended or adjusted under 35 U.S.C. 154(b) by 80 days.

(21) Appl. No.: 12/777,696

(22) Filed: May 11, 2010

(65) Prior Publication Data

US 2011/0247377 A1    Oct. 13, 2011

(30) Foreign Application Priority Data

Apr. 9, 2010   (TW) .............................. 99111032 A

(51) Int. Cl.
*B60R 25/00* (2006.01)
(52) U.S. Cl. ..................... 70/18; 70/19; 70/208; 70/226; 188/32
(58) Field of Classification Search ................ 70/14, 18, 70/19, 208, 225, 226, 237, 259, 260; 188/32
See application file for complete search history.

(56) References Cited

U.S. PATENT DOCUMENTS

| | | | |
|---|---|---|---|
| 1,800,708 A * | 4/1931 | Wartian ............................. | 70/18 |
| 1,819,813 A * | 8/1931 | Ellenberger ...................... | 70/19 |
| 2,960,857 A * | 11/1960 | Winter ............................... | 70/19 |
| 3,299,678 A * | 1/1967 | Spencer ........................... | 70/208 |
| 5,176,013 A * | 1/1993 | Kutauskas ........................ | 70/18 |
| 5,628,212 A * | 5/1997 | Fritzler ............................. | 70/19 |
| 5,865,048 A * | 2/1999 | Beavers et al. .................... | 70/18 |
| 5,887,462 A * | 3/1999 | Stone ............................... | 70/19 |
| 6,032,497 A * | 3/2000 | Fulcher et al. .................... | 70/19 |
| 6,427,885 B1 * | 8/2002 | Dexel ......................... | 224/42.24 |
| 7,032,416 B1 * | 4/2006 | Wu .................................. | 70/19 |
| 7,594,415 B1 * | 9/2009 | Wu .................................. | 70/18 |

FOREIGN PATENT DOCUMENTS

GB    2179607 A    3/1987

\* cited by examiner

*Primary Examiner* — Lloyd Gall
(74) *Attorney, Agent, or Firm* — Muncy, Geissler, Olds & Lowe, PLLC

(57) ABSTRACT

A tire lock includes a body to which a positioning member and a stop member are connected. A threaded rod is located in a movable member in the body and a clamping member is threadedly connected to the threaded rod. A plate is connected to the body and located at the conjunction of the body and the fixed member. A rotating unit includes a shaft which is located in the passage of the threaded rod. A first driving member is fixed to the threaded rod and located outside of the passage. A second driving member is fixed to the shaft so that a second protrusion on the second driving member drives a first protrusion on the first driving member to move the clamping member relative to the threaded rod.

8 Claims, 12 Drawing Sheets

TIRE LOCK

FIELD OF THE INVENTION

The present invention relates to a tire lock, and more particularly, to a tire lock having a second driving member to drive a first driving member so that a clamping member is moved along a threaded rod to adjust the distance between a lock body and the clamping member.

BACKGROUND OF THE INVENTION

A conventional tire lock is disclosed in GB2179607 as shown in FIG. 12, and generally includes an L-shaped body A which has a movable member A1 pivotably connected to one end thereof and a sleeve A2 is mounted to the movable member A1 so as to move the movable member A1. A lock core A3 is located at the connection between the body A and the sleeve A2, such that the sleeve A2 is secured and the body A can lock the tire when the lock core A3 is locked. When unlocking the tire lock, the lock core A3 has to be unlocked and removed from the body A, and the user uses an elongate hand tool to insert into the sleeve A2 and drives the sleeve A2 to extend so as to remove the movable member A1. The lock core A3 has to be removed from the body A and the user has to carry the elongate hand tool, both of which are inconvenient to the user. The hand tool could be lost and cannot unlock the tire lock.

Another tire lock includes a movable rod pivotably connected to the body of the tire lock and a sleeve is mounted to the movable rod. A lock core on the body includes a rotary unit and the sleeve includes a threaded rod threadedly received in the sleeve. The rotary unit includes a driving rod which is inserted into the chamber in the threaded rod. A first protrusion is fixed to the outside of the chamber of the threaded rod and a second protrusion is fixed to the driving rod. The second protrusion includes a second driving member which drives a first driving member on the first protrusion to move the sleeve on the threaded rod. However, there is not any device to cover the body and the sleeve, so damage can happen between the body and the sleeve to unlock the tire lock. Besides, the movable rod is connected to the body in a pivotal manner which is easily damaged, and the trace that the movable rod moves is a curved trace so that the angle of movement is limited and cannot proceed in a wide angular operation, thereby restricting the tire lock from be applied to large size tires.

SUMMARY OF THE INVENTION

The present invention relates to a tire lock and comprises a body having a positioning member and a stop member. The body has a hollow fixed member connected thereto and a recess is defined in the body and located opposite to the fixed member. A threaded rod is located in the fixed member and includes a passage defined therein. A resilient member is located in the passage. A clamping member is threadedly connected to the threaded rod and has a first pawl. A plate is connected to the body and located between the body and the first pawl. A reinforcement rib is connected to the plate and the body. A rotating unit is located in the recess of the body and has a handle. A shaft extends from the handle and has a notch. A first driving member is fixed to outside of the passage of the threaded rod and has a first protrusion. A second driving member is fixed to the shaft of the rotating unit and has a second protrusion which drives the first protrusion. A lock core is located in the body and has an insertion.

A second pawl is connected to the clamping member and located opposite to the first pawl.

The body includes reinforcement plates received therein.

The fixed member includes a first hole and a first pin is inserted into the first hole.

The body includes a lock case and a second hole is defined through the lock case. A second pin extends through the second hole and secures the lock core in the lock case.

The handle of the rotating unit includes a chamber and the lock core is received in the chamber. The insertion of the lock core protrudes from the rotating unit.

The positioning member is connected with a socket.

The shaft has a through hole and the second driving member extends through the through hole.

The present invention provides an alternative tire lock and comprises a body having a hollow fixed member connected thereto and a threaded rod is located in the fixed member. The threaded rod includes a passage defined therein and a clamping member is threadedly connected to the threaded rod. The clamping member has a first pawl and a plate is connected to the body and located between the body and the first pawl.

The present invention provides a plate which covers the gap between the clamping member and the wheel so as to prevent damage by inserting tools into the gap.

The distance between the clamping member and the body can be quickly adjusted by the second protrusion driving the first protrusion without needing any tool.

The clamping member moves linearly along the threaded rod and can easily lock the tires in different sizes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
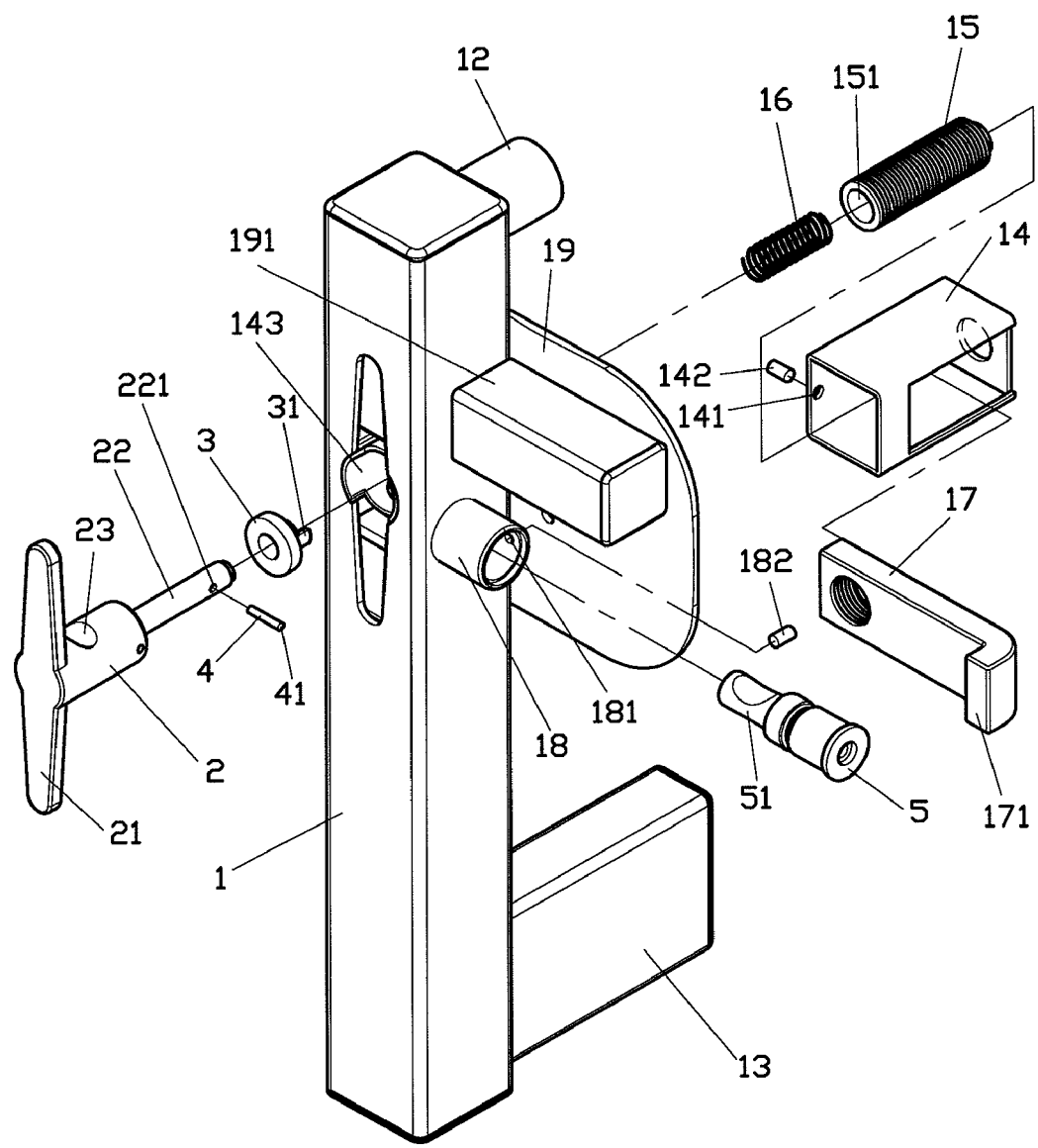
FIG. 1 is an exploded view to show the tire lock of the present invention.
Figure 2:
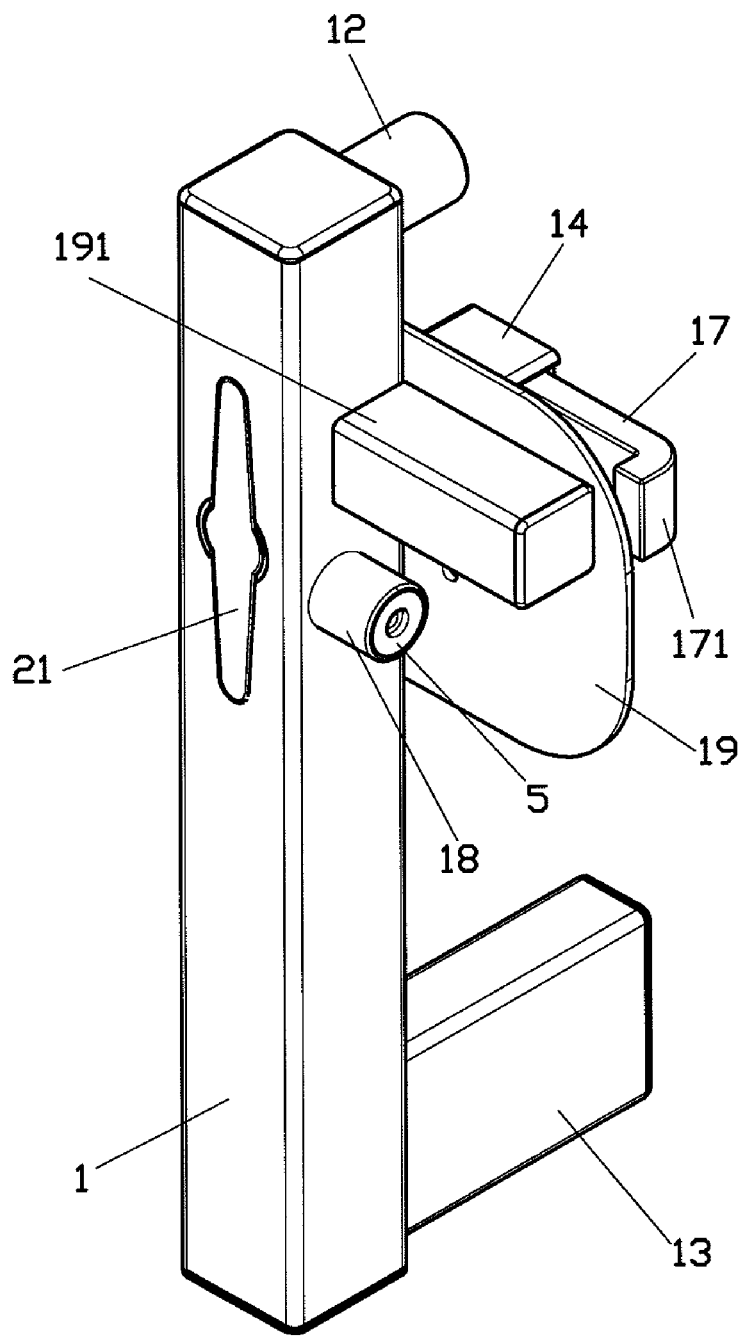
FIG. 2 is a perspective view to show the tire lock of the present invention.
Figure 3:
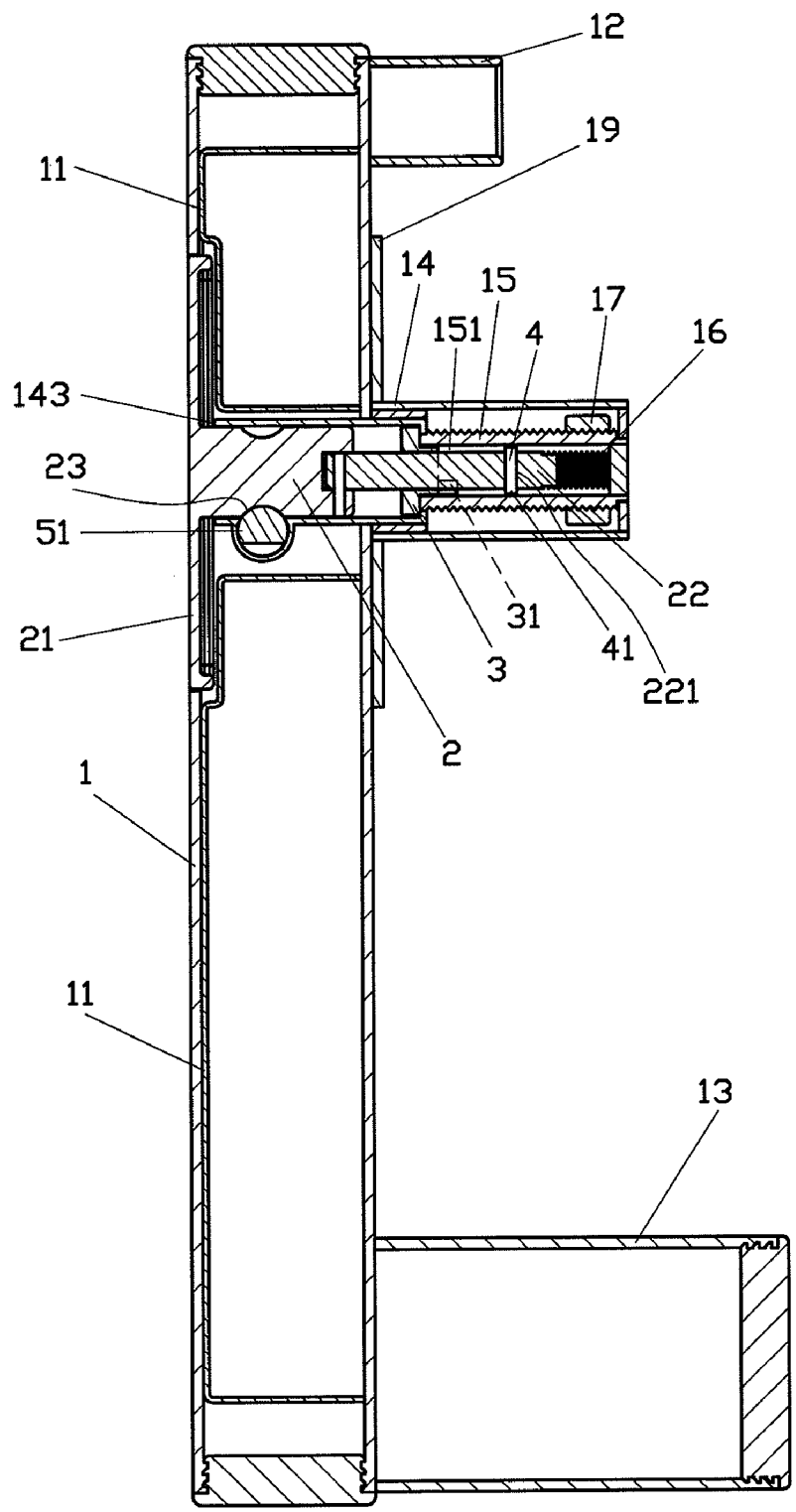
FIG. 3 is a cross sectional view of the tire lock of the present invention.

Referring to FIGS. 1, 2 and 3, the tire lock of the present invention comprises a body 1, a rotating unit 2, a first driving member 3, a second driving member 4 and a lock core 5.

The body 1 is an L-shaped hollow body and has reinforcement plates 11 received therein which are made by way of heat treatment so as to reinforce the strength of the body 1 and prevent it from being cut or damaged. A tubular positioning member 12 extends from one end of the body 1 and a stop member 13 extends from the other end of the body 1. A hollow and rectangular fixed member 14 is welded to the body 1 and includes a first hole 141 in which a first pin 142 is inserted. A recess 143 is defined in the body 1 and located opposite to the fixed member 14. A threaded rod 15 is located in the fixed member 14 and includes a passage 151 defined therein. A resilient member 16 is located in the passage 151. The resilient member 16 is a spring. A clamping member 17 is threadedly connected to the threaded rod 15 and movable along the threaded rod 15 which does not move linearly. The clamping member 17 has a first pawl 171. A lock case 18 is connected to the body 1 and perpendicular to the fixed member 14, and a second hole 181 is defined through the lock case 18. A second pin 182 extends through the second hole 181 and secures the lock core 5 in the lock case 18. A plate 19 is connected to the body 1 and located between the body 1 and the first pawl 171. A reinforcement rib 191 is connected to the plate 19 and the body 1.

The rotating unit 2 is located in the recess 143 of the body 1 and includes a handle 21 which is received in the recess 143 and is flush with an outer surface of the body 1. A shaft 22 extends from the handle 21 and has a through hole 221 defined close to an end thereof. The shaft 22 is inserted into the passage 151 of the threaded rod 15 and compresses the resilient member 16. A notch 23 is defined in an outer surface of the rotating unit 2.

The first driving member 3 is fixed to the opened end of the passage 151 of the threaded rod 15 and has a first protrusion 31 which extends into the passage 151.

The second driving member 4 is fixed to the through hole 221 in the distal end of the shaft 22 of the rotating unit 2 and has a second protrusion 41 which is located corresponding to the first protrusion 31 of the first driving member 3 so as to drive the first protrusion 31.

The lock core 5 is located in the lock case 18 of the body 1 and is positioned by the second pin 182. The lock core 5 has an insertion 51 which is rotatably engaged with the notch 23 in the rotating unit 2 such that the rotating unit 2 cannot pop out from the body 1.

Figure 4:
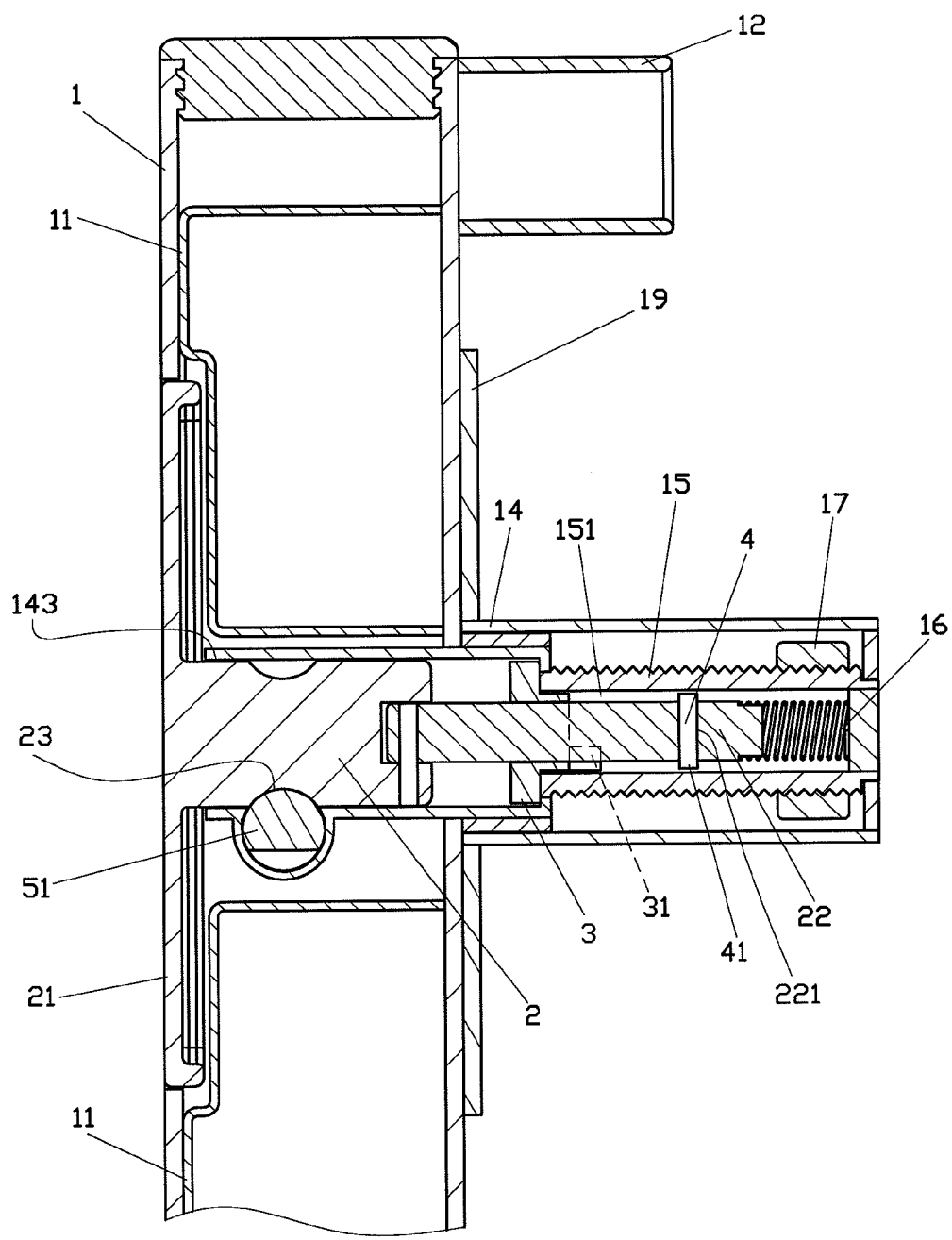
FIG. 4 is an enlarged cross sectional view to show the tire lock of the present invention.
Figure 5:
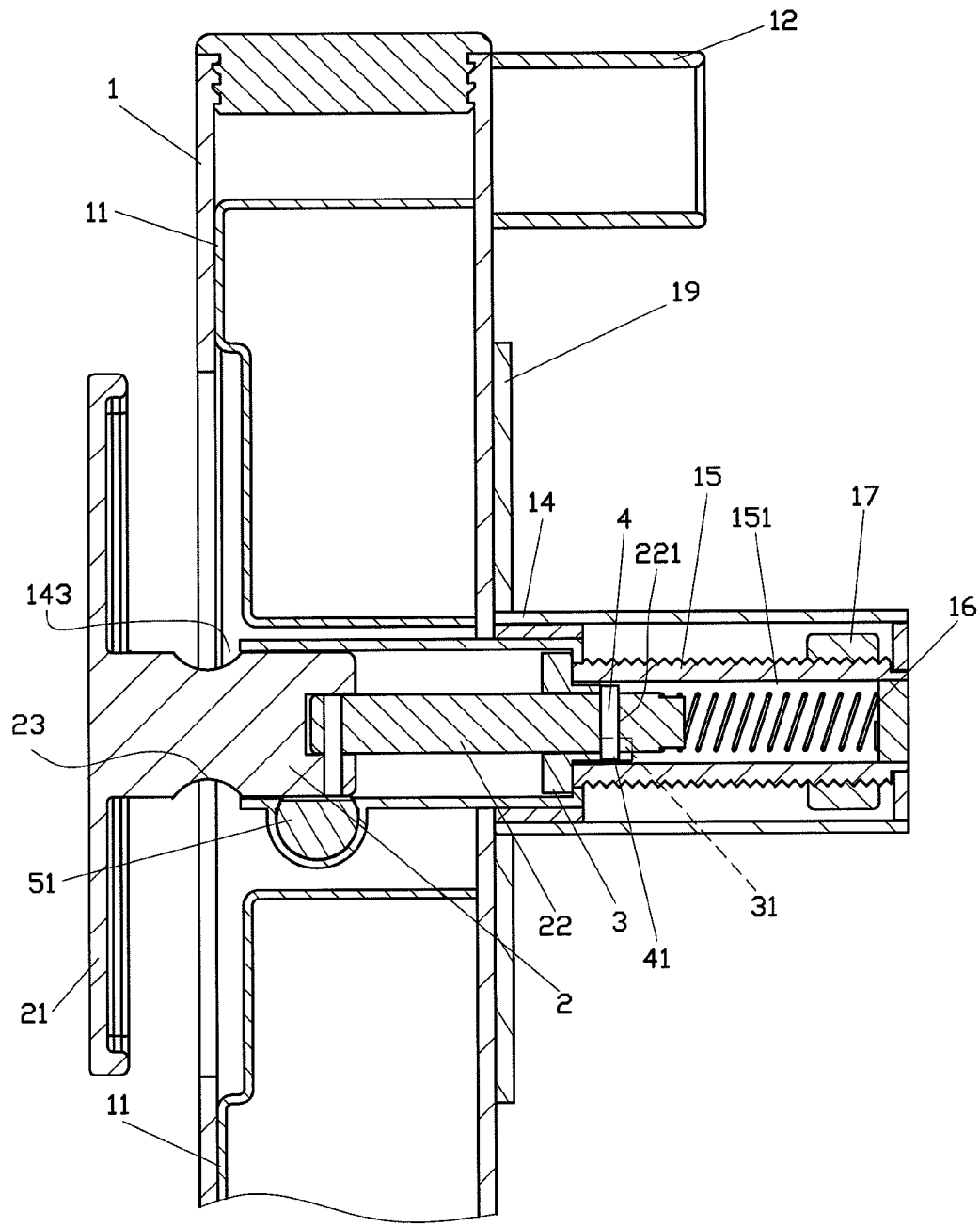
FIG. 5 is a cross sectional view to show that the rotating unit protrudes from the body of the tire lock of the present invention.
Figure 6:
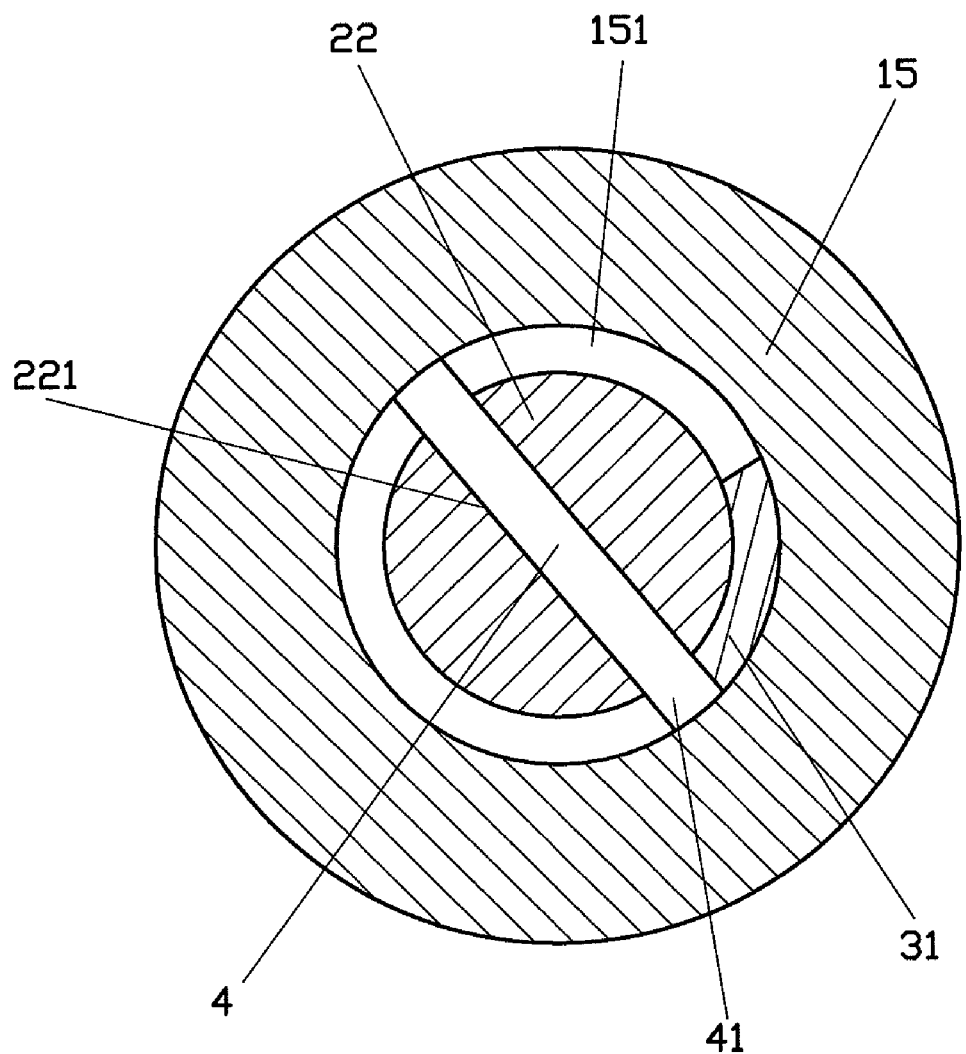
FIG. 6 is an end cross sectional view to show the engagement of the first and second protrusions of the tire lock of the present invention.
Figure 7:
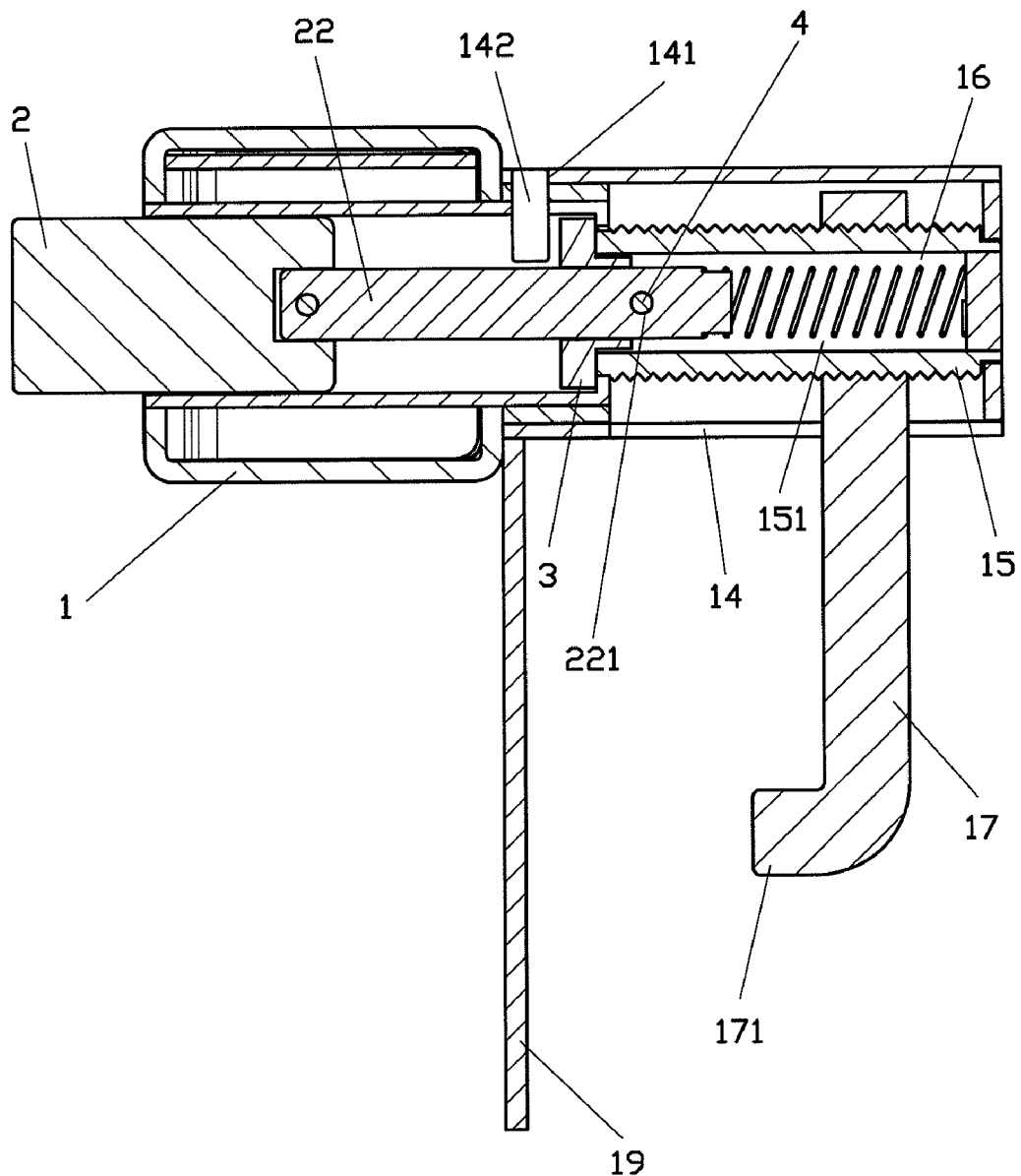
FIG. 7 is a cross sectional view to show that the clamping member is moved away from the body of the tire lock of the present invention.
Figure 8:
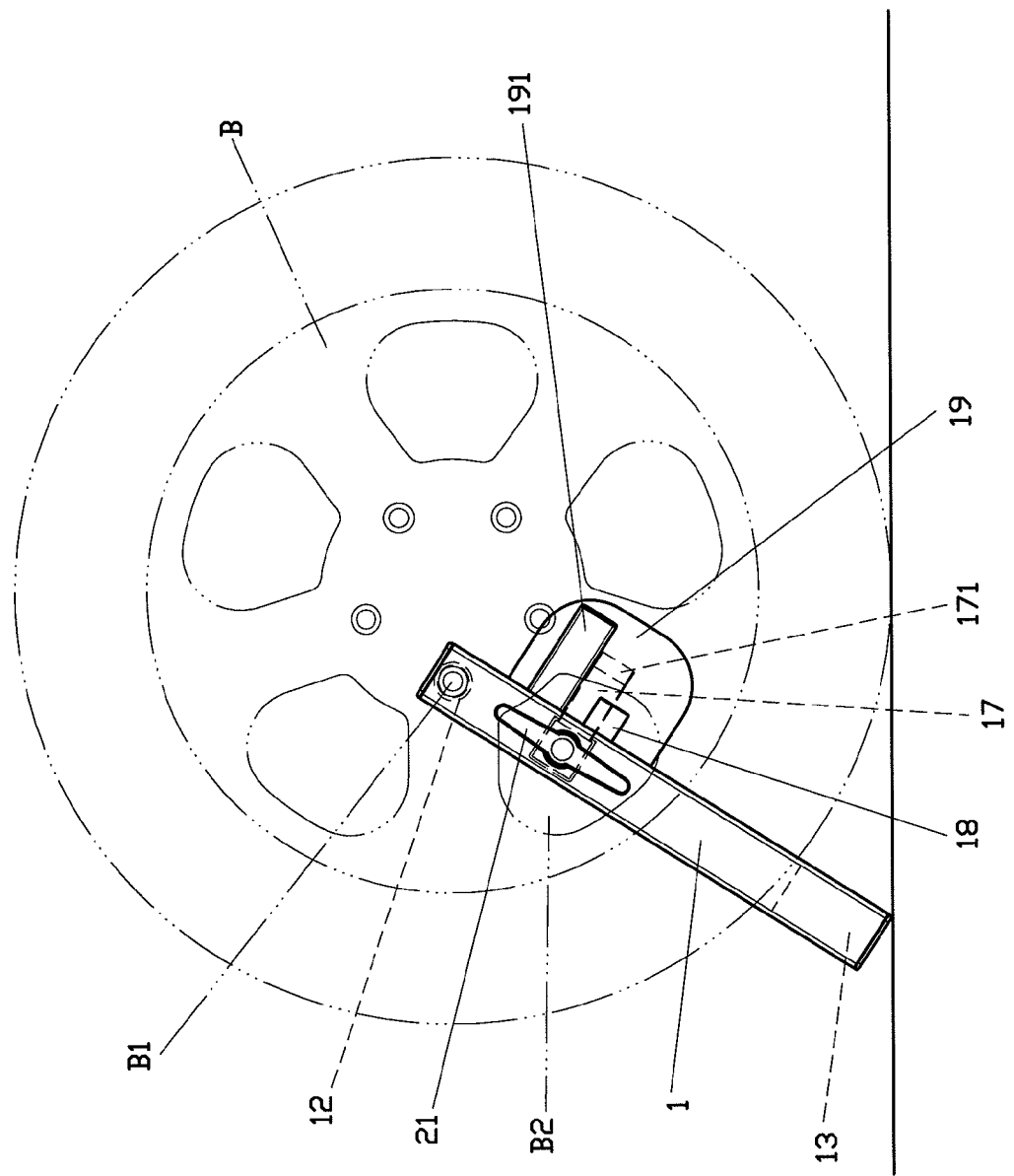
FIG. 8 shows the tire lock of the present invention connected to a wheel.

When in use, as shown in FIGS. 1 and 4, the lock core 5 is unlocked and the insertion 51 of the lock core 5 is rotated and removed from the notch 23 of the rotating unit 2 as shown in FIG. 5. The shaft 22 of the rotating unit 2 is pushed by the force from the resilient member 16 so that the shaft 22 is pushed out from the passage 151 of the threaded rod 15. The second protrusion 41 of the second driving member 4 on the shaft 22 is stopped by the first driving member 3 fixed on the threaded rod 15, so that the shaft 22 does not drop from the recess 143 of the body 1. Only the handle 21 pops out from the recess 143 and the user can rotate the handle 21 to rotate the shaft 22. The second protrusion 41 of the second driving member 4 drives the first protrusion 31 of the first driving member 3 as shown in FIG. 6 so that the threaded rod 15 begins to spin which does not move linearly and the clamping member 17 moves linearly along the threaded rod 15. When the clamping member 17 moves to a proper distance relative to the threaded rod 15, the positioning member 12 of the body 1 is mounted to the bolt B1 on the wheel B as shown in FIG. 8, and the clamping member 17 is inserted into the heat dispensing hole B2 of the wheel B. The handle 21 of the rotating unit 2 is then rotated reversely to move the clamping member 17 in an opposite direction until the first pawl 171 of the clamping member 17 securely holds the inside of the wheel B. The rotating unit 2 is then retracted into the recess 143 as shown in FIG. 4. The shaft 22 compresses the resilient member 16 again and the lock core 5 is locked. The insertion 51 is rotated again and engaged with the notch 23 of the rotating member 2 such that the rotating unit 2 does not protrude from the body 1, and the second protrusion 41 of the second driving member 4 is not in contact with the first protrusion 31 of the first driving member 3. Therefore, the body 1 is fixed to the wheel B. The stop member 13 on the body 1 contacts against the road surface to prevent the wheel B from rotating and the plate 19 hides the gap between the clamping member 17 and the wheel B to avoid damage by inserting tools into the gap. The trace of the clamping member 17 relative to the body 1 is a straight line so that the clamping distance can be large enough to be used on the wheels B in different sizes.

Figure 9:
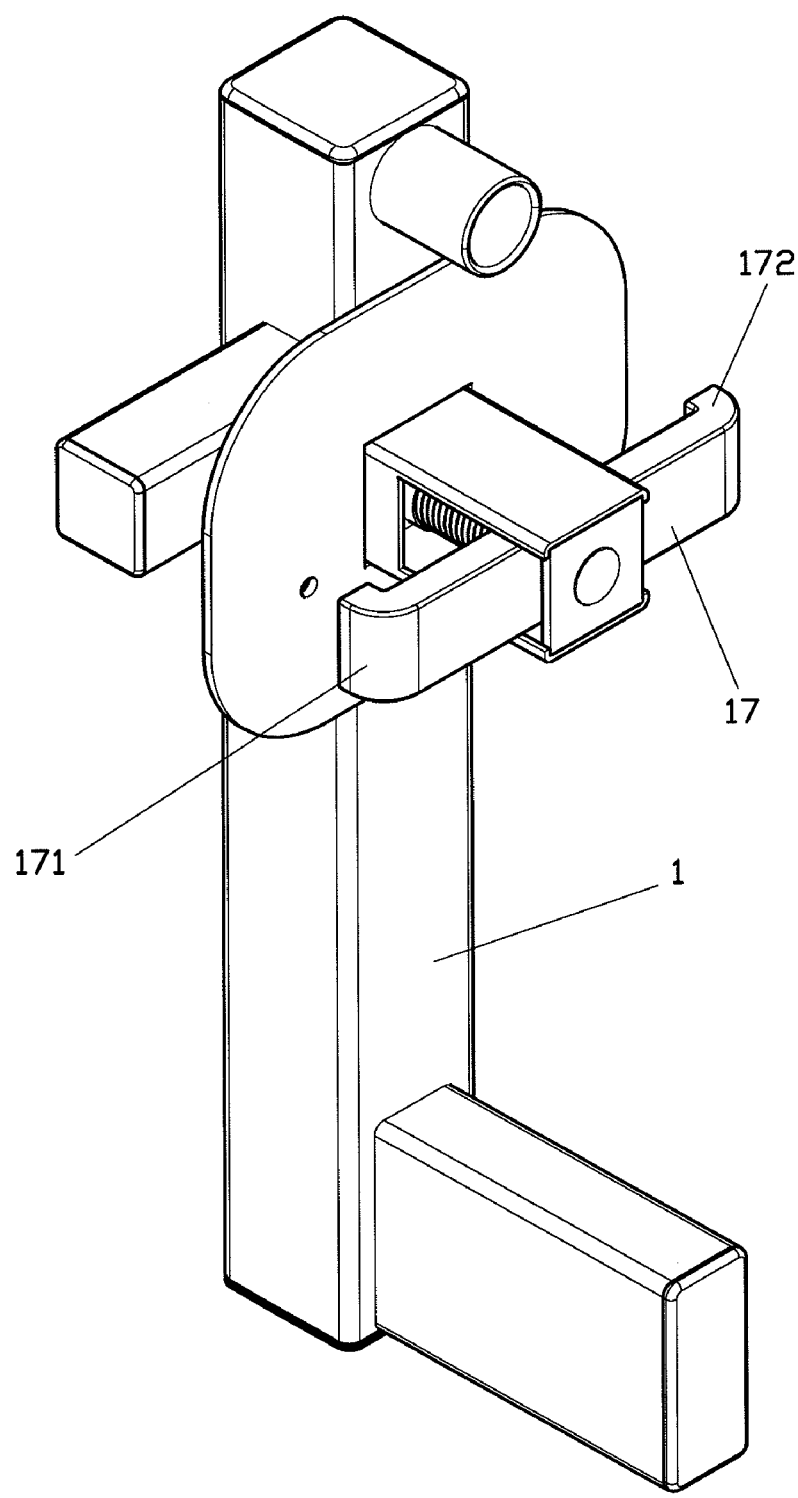
FIG. 9 is a perspective view to show another embodiment of the present invention.

FIG. 9 shows another embodiment of the present invention, wherein a second pawl 172 is connected to the clamping member 17 and located opposite to the first pawl 171. The first and second pawls 171, 172 hold both inside and outside of the wheel B.

Figure 10:
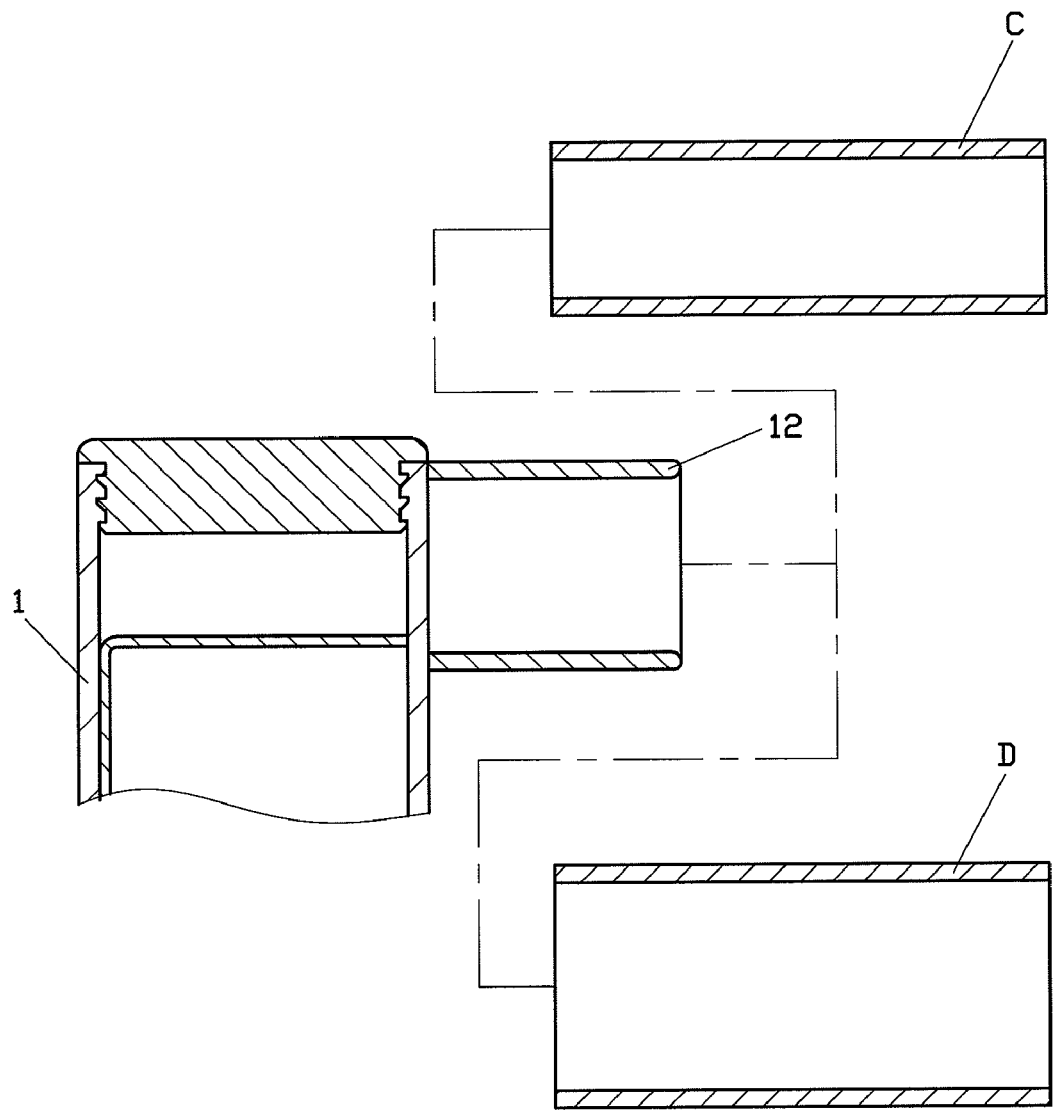
FIG. 10 is a cross sectional view to show that different sockets are connected to the positioning member of the tire lock of the present invention.

FIG. 10 shows yet another embodiment of the present invention, wherein the positioning member 12 is connected with sockets C, D in different sizes so as to be mounted to the bolts in different sizes.

Figure 11:
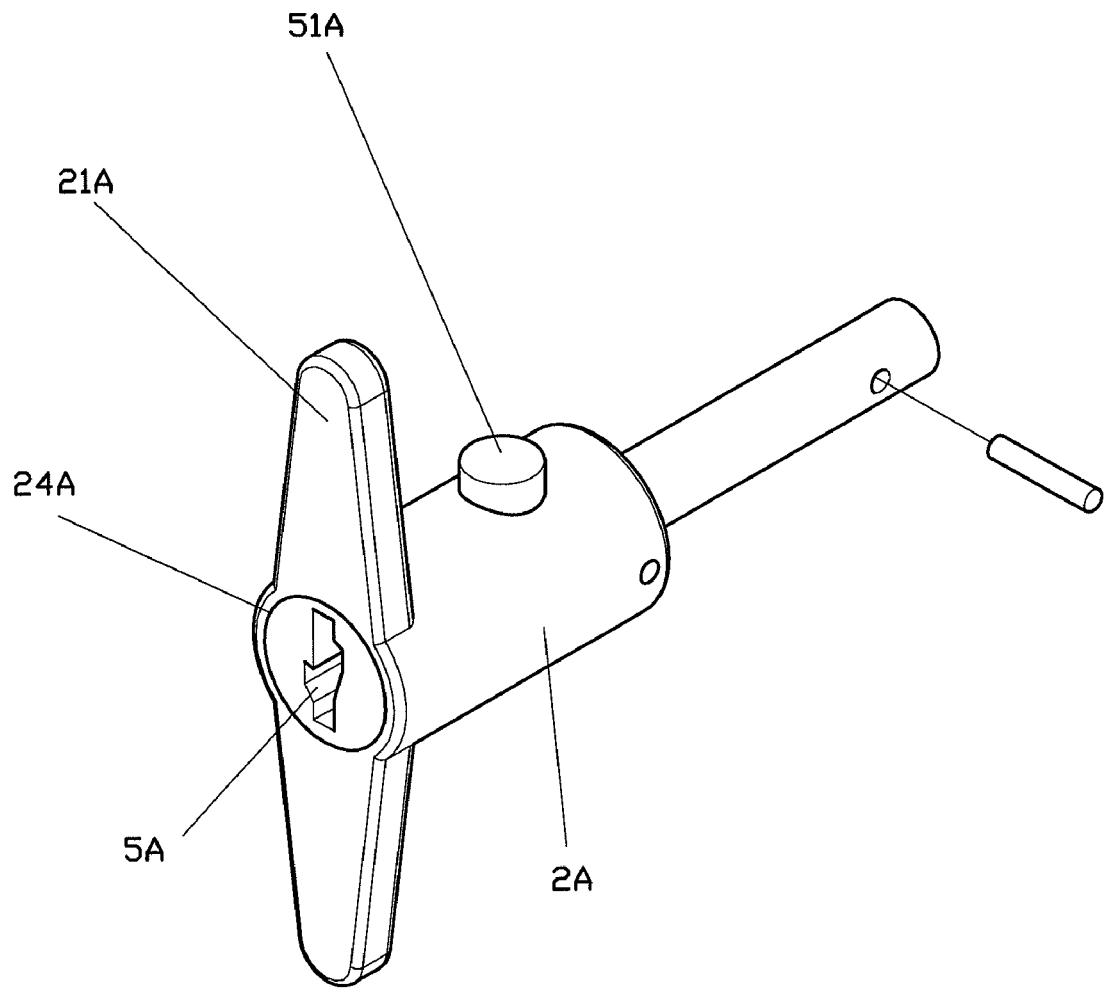
FIG. 11 shows another embodiment of the rotating unit.
Figure 12:
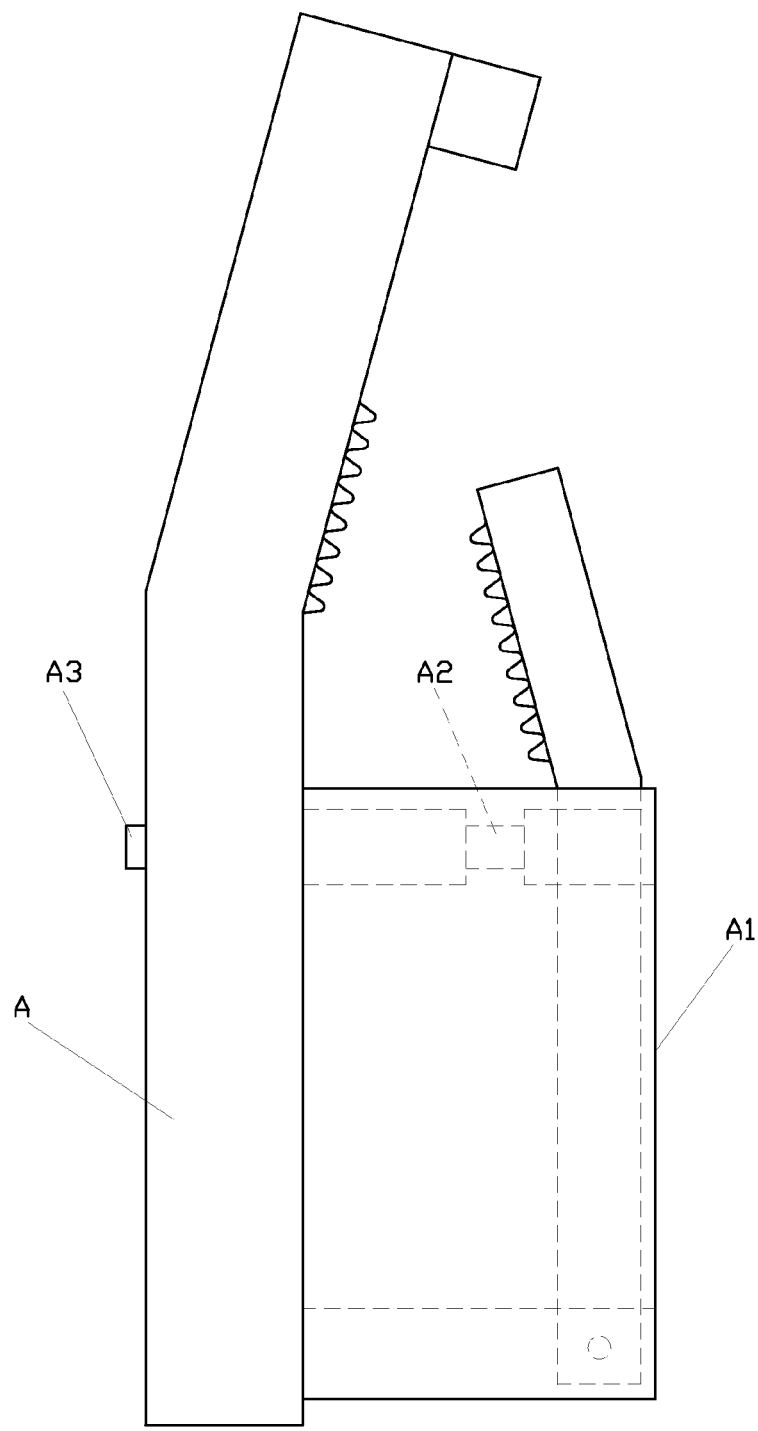
FIG. 12 shows a conventional tire lock.

FIG. 11 shows a further embodiment of the present invention, wherein the handle 21A of the rotating unit 2A includes a chamber 24A and the lock core 5A is received in the chamber 24A. When the lock core 5A is locked, the insertion 51A of the lock core 5A protrudes from the rotating unit 2A and positions the rotating unit 2A which cannot be disengaged from the body 1.

While we have shown and described the embodiment in accordance with the present invention, it should be clear to those skilled in the art that further embodiments may be made without departing from the scope of the present invention.

What is claimed is:

1. A tire lock, comprising:
   a body having a positioning member and a stop member, the body having a hollow fixed member connected thereto and a recess defined in the body and located opposite to the fixed member, a threaded rod located in the fixed member and including a passage defined therein, a resilient member located in the passage, a clamping member threadedly connected to the threaded rod and having a first pawl, a plate connected to the body and located between the body and the first pawl, a reinforcement rib connected to the plate and the body;
   a rotating unit located in the recess of the body and having a handle, a shaft extending from the handle and having a notch;
   a first driving member fixed to an opened end of the passage of the threaded rod and having a first protrusion;
   a second driving member fixed to the shaft of the rotating unit and having a second protrusion which drives the first protrusion, and
   a lock core located in the body and having an insertion.

2. The tire lock as claimed in claim 1, wherein a second pawl is connected to the clamping member and located opposite to the first pawl.

3. The tire lock as claimed in claim 1, wherein the body includes reinforcement plates received therein.

4. The tire lock as claimed in claim 1, wherein the fixed member includes a first hole and a first pin is inserted into the first hole.

5. The tire lock as claimed in claim 1, wherein the body includes a lock case and a second hole is defined through the lock case, a second pin extends through the second hole and secures the lock core in the lock case.

6. The tire lock as claimed in claim 1, wherein the positioning member is connected with a socket.

7. The tire lock as claimed in claim 1, wherein the shaft has a through hole and the second driving member extends through the through hole.

8. A tire lock, comprising:
- a body having a positioning member and a stop member, the body having a hollow fixed member connected thereto and a recess defined in the body and located opposite to the fixed member, a threaded rod located in the fixed member and including a passage defined therein, a resilient member located in the passage, a clamping member threadedly connected to the threaded rod and having a first pawl, a plate connected to the body and located between the body and the first pawl, a reinforcement rib connected to the plate and the body;
- a rotating unit located in the recess of the body and having a handle and a shaft extending from the handle, wherein the handle of the rotating unit includes a chamber, a lock core having an insertion is received in the chamber, and the insertion of the lock core protrudes from the rotating unit;
- a first driving member fixed to an opened end of the passage of the threaded rod and having a first protrusion; and
- a second driving member fixed to the shaft of the rotating unit and having a second protrusion which drives the first protrusion.

* * * * *